(12) United States Patent
Xu et al.

(10) Patent No.: US 9,753,458 B2
(45) Date of Patent: Sep. 5, 2017

(54) VEHICLE OPERATION CONTROL METHOD, DEVICE AND SYSTEM

(71) Applicant: Leauto Intelligent Technology (BEIJING) Co., Ltd., Beijing (CN)

(72) Inventors: Yong Xu, Beijing (CN); Kunsheng Chen, Beijing (CN); Wenrui Li, Beijing (CN); Peng Liu, Beijing (CN); Wei Lin, Beijing (CN)

(73) Assignee: LEAUTO INTELLIGENT TECHNOLOGY (BEIJING) CO., LTD., Beijing (CN)

( * ) Notice: Subject to any disclaimer, the term of this patent is extended or adjusted under 35 U.S.C. 154(b) by 84 days.

(21) Appl. No.: 14/970,417

(22) Filed: Dec. 15, 2015

(65) Prior Publication Data

US 2017/0108859 A1 Apr. 20, 2017

(30) Foreign Application Priority Data

Oct. 19, 2015 (CN) .......................... 2015 1 0679474

(51) Int. Cl.
| | |
|---|---|
| *G06F 21/00* | (2013.01) |
| *H04B 7/26* | (2006.01) |
| *G05D 1/00* | (2006.01) |
| *G07C 5/00* | (2006.01) |
| *H04L 29/08* | (2006.01) |
| *H04L 29/06* | (2006.01) |

(Continued)

(52) U.S. Cl.
CPC ........... *G05D 1/0022* (2013.01); *G07C 5/008* (2013.01); *H04B 7/26* (2013.01); *H04L 63/0876* (2013.01); *H04L 67/12* (2013.01); *H04L 2209/84* (2013.01); *H04W 12/06* (2013.01)

(58) Field of Classification Search
CPC ........ G05D 1/0022; G07C 5/008; H04B 7/26; H04L 67/12
See application file for complete search history.

(56) References Cited

U.S. PATENT DOCUMENTS

2012/0254948 A1* 10/2012 Kleve .................. H04L 9/3215
726/4

FOREIGN PATENT DOCUMENTS

CN WO 2017020206 A1 * 2/2017 ............ H04W 12/06

* cited by examiner

*Primary Examiner* — Dale Moyer
(74) *Attorney, Agent, or Firm* — Renner Otto Boisselle & Sklar, LLP

(57) ABSTRACT

The present disclosure provides a vehicle operation control method, device and system. The vehicle operation control method includes: receiving a vehicle operation instruction sent by a user terminal over a cellular network, which carries a vehicle identifier of an operated vehicle; searching stored correspondence relationships between vehicle identifiers and vehicle positional information for vehicle positional information of the operated vehicle according to the vehicle identifier, wherein the vehicle positional information is reported by the operated vehicle through a home road communication base station, and a signal coverage area of the home road communication base station covers the position where the operated vehicle is located; determining a device identifier of the home road communication base station of the operated vehicle according to the found vehicle positional information; and sending the vehicle operation instruction to the operated vehicle through the home road communication base station corresponding to the device identifier.

11 Claims, 3 Drawing Sheets

(51) Int. Cl.
    *H01L 29/08*     (2006.01)
    *H04W 12/06*     (2009.01)

VEHICLE OPERATION CONTROL METHOD, DEVICE AND SYSTEM

CROSS-REFERENCE TO RELATED APPLICATION

This application claims the priority to Chinese Patent Application No. 201510679474.8, filed with the State Intellectual Property Office of People's Republic of China on Oct. 19, 2015 and entitled "Vehicle operation control method, device and system", the content of which is hereby incorporated by reference in its entirety.

FIELD OF TECHNOLOGY

The present disclosure relates to the field of the Internet of vehicles and particularly to a vehicle operation control method, device and system.

BACKGROUND

At present a transceiver and other devices need to be installed in a vehicle so that the vehicle can be locked or unlock remotely, and a user sends a lock or unlock instruction to the transceiver installed in the vehicle through a remote controller, where the remote controller and the transceiver communicate with each other through short-distance communication technologies, e.g., Bluetooth technology, radio frequency identification technology, etc. The transceiver installed in the vehicle sends the received lock or unlock instruction to an Electric Control Unit (ECU) of the vehicle over a bus upon reception of the lock or unlock instruction, so that the ECU of the vehicle is responsible for performing a corresponding lock or unlock operation.

In the existing lock or unlock solution, the remote controller of the vehicle has to communicate with the transceiver installed in the vehicle through short-distance communication technologies, so if the distance between them is larger than the longest supportable communication distance, then the transceiver may fail to receive the lock, unlock or another operation instruction sent by the remote controller, so that no lock or unlock operation can be performed. For example, if a user getting back home realizes that he or she forgets locking his or her car, then he or she has to go back around the place where the car is parked to lock the car through the remote controller.

In view of this, it is highly desirable in the prior art to address the technical problem of how to perform vehicle operations including locking or unlocking the vehicle over a long distance.

SUMMARY

The present disclosure provides a vehicle operation control method, device and system so as to perform a vehicle operation over a long distance.

An embodiment of the present disclosure provides a vehicle operation control method including:
  receiving a vehicle operation instruction sent by a user terminal over a cellular network, wherein the vehicle operation instruction carries a vehicle identifier of an operated vehicle;
  searching stored correspondence relationships between vehicle identifiers and vehicle positional information for vehicle positional information of the operated vehicle according to the vehicle identifier, wherein the vehicle positional information is reported by the operated vehicle through a home road communication base station, and a signal coverage area of the home road communication base station covers the position where the operated vehicle is located;
  determining a device identifier of the home road communication base station of the operated vehicle according to the found vehicle positional information; and
  sending the vehicle operation instruction to the operated vehicle through the home road communication base station corresponding to the device identifier.

An embodiment of the present disclosure provides a vehicle operation control device including:
  a first receiving unit configured to receive a vehicle operation instruction sent by a user terminal over a cellular network, wherein the vehicle operation instruction carries a vehicle identifier of an operated vehicle;
  a searching unit configured to search stored correspondence relationships between vehicle identifiers and vehicle positional information for vehicle positional information of the operated vehicle according to the vehicle identifier, wherein the vehicle positional information is reported by the operated vehicle through a home road communication base station, and a signal coverage area of the home road communication base station covers the position where the operated vehicle is located;
  a determining unit configured to determine a device identifier of the home road communication base station of the operated vehicle according to the found vehicle positional information; and
  a sending unit configured to send the vehicle operation instruction to the operated vehicle through the home road communication base station corresponding to the device identifier.

An embodiment of the present disclosure provides a vehicle operation control system including a user terminal, a network server, at least one road communication base station, and at least one vehicle in which a communication module is installed, wherein:
  the vehicle is configured to report its vehicle positional information to the network server over a home road communication base station of the vehicle, wherein a signal coverage area of the home road communication base station of the vehicle covers the position where the vehicle is located; and to perform a corresponding operation upon reception of a vehicle operation instruction sent by the network server through the home road communication base station;
  the user terminal is configured to send the vehicle operation instruction to the network server, wherein the vehicle operation instruction carries a vehicle identifier of the operated vehicle;
  the network server is configured to store a correspondence relationship between the vehicle identifier of the vehicle and the vehicle positional information reported by the vehicle upon reception of the vehicle positional information reported by the vehicle; and upon reception of the vehicle operation instruction, to search the stored correspondence relationships between vehicle identifiers and vehicle positional information for the vehicle positional information corresponding to the vehicle identifier carried in the vehicle operation instruction according to the vehicle identifier carried in the vehicle operation instruction; to determine a device identifier of the home road communication base station of the operated vehicle according to the found vehicle positional information; and to send the vehicle operation instruction to the operated vehicle through the home road communication base station corresponding to the device identifier.

An embodiment of the present disclosure provides a vehicle operation control device including a memory and a processor, wherein the processor can be configured to read program in the memory and to perform a process including: receiving a vehicle operation instruction sent by a user terminal over a cellular network, wherein the vehicle operation instruction carries a vehicle identifier of an operated vehicle; searching stored correspondence relationships between vehicle identifiers and vehicle positional information for vehicle positional information of the operated vehicle according to the vehicle identifier, wherein the vehicle positional information is reported by the operated vehicle through a home road communication base station, and a signal coverage area of the home road communication base station covers the position where the operated vehicle is located; determining a device identifier of the home road communication base station of the operated vehicle according to the found vehicle positional information; and sending the vehicle operation instruction to the operated vehicle through the home road communication base station corresponding to the device identifier.

BRIEF DESCRIPTION OF THE DRAWINGS

In order to describe more clearly the technical solutions according to the embodiments of the present disclosure or in the prior art, the drawings to which reference is made in the description of the embodiments or the prior art will be described below briefly, and evidently the drawings described below are merely illustrative of some of the embodiments of the present disclosure, and those ordinarily skilled in the art can further derive other drawings from these drawings without any inventive effort. In the drawings.

DESCRIPTION OF THE EMBODIMENTS

In order to make the objects, technical solutions, and advantages of the present disclosure more apparent, the technical solutions according to the embodiments of the present disclosure will be described below clearly and fully with reference to the drawings in the embodiments of the present disclosure, and apparently the embodiments described below are only a part but not all of the embodiments of the present disclosure. All the other embodiments which can occur to those ordinarily skilled in the art based upon the embodiments here in the present disclosure without any inventive effort shall fall into the clamed scope of the present disclosure.

The Vehicle to X (V2X) technology is one of existing hot research issues in the field of the Internet of vehicles, where V represents a vehicle, 2 represents "to", and X represents a vehicle, a road, a bike, a passerby, and other various communication objects. Vehicles, roads, parking lots, etc., in the Internet of vehicles based on the V2X technology need to have the capability of V2X communication. For example, a V2X communication module needs to be installed in a vehicle, road communication base stations 15 supporting V2X communication need to be installed on a road or a parking lot. As opposed to cellular network base stations, the road communication base stations 15 are generally installed on both sides of a road or in a parking lot, and the respective road communication base stations 15 are connected with each other over a private network or can V2X communicate directly with each other.

Figure 1:
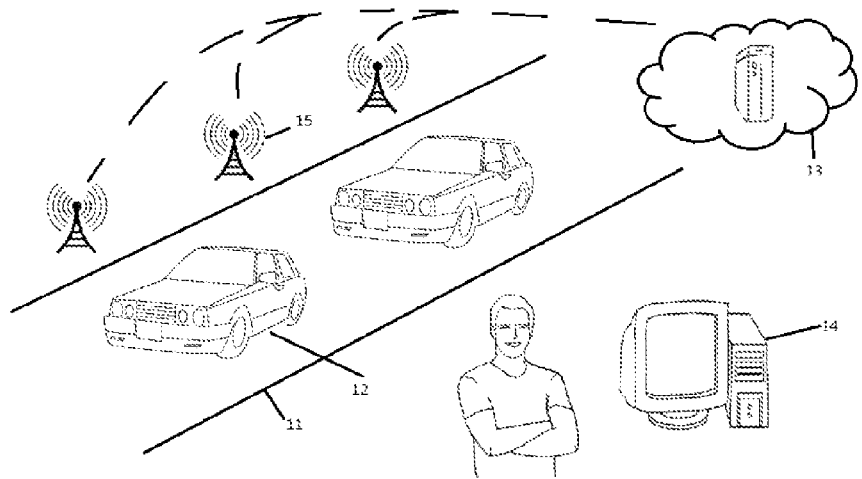
FIG. 1 illustrates a schematic diagram of the network architecture of the Internet of vehicles based on the V2X technology according to the present disclosure.

As illustrated in FIG. 1, there is illustrated a schematic diagram of the network architecture of Internet of vehicles based on the V2X technology, which includes a road 11, vehicles 12, a network server 13, and a user terminal 14, where road communication base stations 15 supporting V2X communication are installed on the road 11 at an interval of distance, and V2X communication modules are arranged in the vehicles 12, so that the vehicle 12 can V2X communication with the road communication base stations 15 installed on the road 11 in compliance with the 802.11p protocol. The road communication base stations 15 installed on the road 11 can V2X communicate with each other or can communicate over a private network. The road communication base stations 15 can communicate with the network server 13 over a cellular network, e.g., a 3G network, a 4G network, etc., or over a private network, and the user terminal 14 can communicate with the network server over a cellular network or a wireless local area network. Each of the road communication base stations 15 has its own signal coverage area and is responsible for reporting vehicle positional information, operating parameter information, and other related information of the vehicles in the signal coverage area thereof, and if some vehicle 12 resides in a signal coverage area of some road communication base station 15, then the road communication base station 15 will be referred to as a home road communication base station of the vehicle 12.

In a particular implementation, the network server 13 needs to store signal coverage areas of the respective installed road communication base stations after the Internet of vehicles is deployed.

It shall be noted that since the vehicles are moveable, the home road communication base stations of the vehicles may vary with the positions of the vehicles while the vehicles are moving.

In a particular implementation, a user is registered with the network server to obtain a user identifier, which can be a username, a handset number of the user, etc., although the embodiment of the present disclosure will not be limited thereto as long as the user can be uniquely identified.

The successfully registered user can bind his or her registered user identifier with the vehicle identifier of his or her vehicle to create a correspondence relationship between the user identifier and the vehicle identifier. In a particular implementation, the user can bind at least one vehicle identifier, and a serving user, e.g., a vehicle lease service enterprise, etc., can bind a plurality of vehicle identifiers.

Particularly the correspondence relationship between the user identifier and the vehicle identifier can be created in the following operations:

In the first operation, a binding request sent by a user terminal is received, which carries a user identifier and the at least one vehicle identifier to be bound.

In a particular implementation, a user who needs to bind the user identifier with the vehicle identifier can send the binding request to the network server through the user terminal by carrying the user identifier and the vehicle identifier to be bound, in the binding request. If the user needs to bind a plurality of vehicle identifiers, then the user can carry the plurality of vehicle identifiers together in one binding request or can carry only one of the vehicle identifiers at a time and bind the user identifier with the plurality of vehicle identifiers by sending a plurality of binding requests to the network server, although the embodiment of the present disclosure will not be limited thereto.

In the second operation, the network server creates the correspondence relationships between the received user identifier and respective vehicle identifiers respectively.

The network server creates and stores locally the correspondence relationships between the user identifier and the vehicle identifiers carried in the binding request upon reception of the binding request. As depicted in Table 1, there is depicted a possible table structure of the correspondence relationships between the user identifiers and the vehicle identifiers, which is stored by the network server:

TABLE 1

| User identifier | Vehicle identifier |
|---|---|
| U-ID1 | V-ID1 |
| U-ID2 | V-ID21 |
|  | V-ID22 |
|  | V-ID23 |
|  | ... |
|  | V-ID24 |
| ... | ... |
| U-IDn | V-IDn |

The vehicle 12 can report its vehicle positional information, operating parameter information, etc., to the network server 13 in real time or periodically through its home road communication base station. The network server stores locally the correspondence relationship between the vehicle identifier and the vehicle positional information of the vehicle upon reception of the vehicle positional information reported by the vehicle 12 through its home road communication base station.

Particularly the vehicle identifier can include but will not be limited to a license plate number of the vehicle, and the vehicle positional information can include but will not be limited to longitude and latitude coordinates of the vehicle geographical position, where Table 2 depicts a possible table structure of the correspondence relationships between the vehicle identifiers and the vehicle positional information:

TABLE 2

| Vehicle identifier | Vehicle positional information |
|---|---|
| V-ID1 | $(x_1, y_1)$ |
| V-ID2 | $(x_2, y_2)$ |
| ... | ... |
| V-IDn | $(x_n, y_n)$ |

In a particular implementation, since the vehicle report its vehicle positional information to the network server in real time or periodically, the network server can replace previously stored vehicle positional information with the latest vehicle positional information when the network server receives vehicle positional information reported by a same vehicle at different time. Alternatively, the network server can store vehicle positional information reported by a vehicle at all times, and determine a location of the vehicle according to the reporting time of the vehicle positional information.

Preferably in a real application, the network server can merge and store Table 1 and Table 2, where Table 3 depicts a possible table structure of merged Table 1 and Table 2:

TABLE 3

| User identifier | Vehicle identifier | Vehicle positional information |
|---|---|---|
| U-ID1 | V-ID1 | $(x_1, y_1)$ |
| U-ID2 | V-ID2 | $(x_2, y_2)$ |
| ... | ... | ... |
| U-IDn | V-IDn | $(x_n, y_n)$ |

A vehicle operation method according to an embodiment of the present disclosure will be introduced below with reference to the schematic diagram of the network architecture of the Internet of vehicles illustrated in FIG. 1 together with the analysis above.

Figure 2:
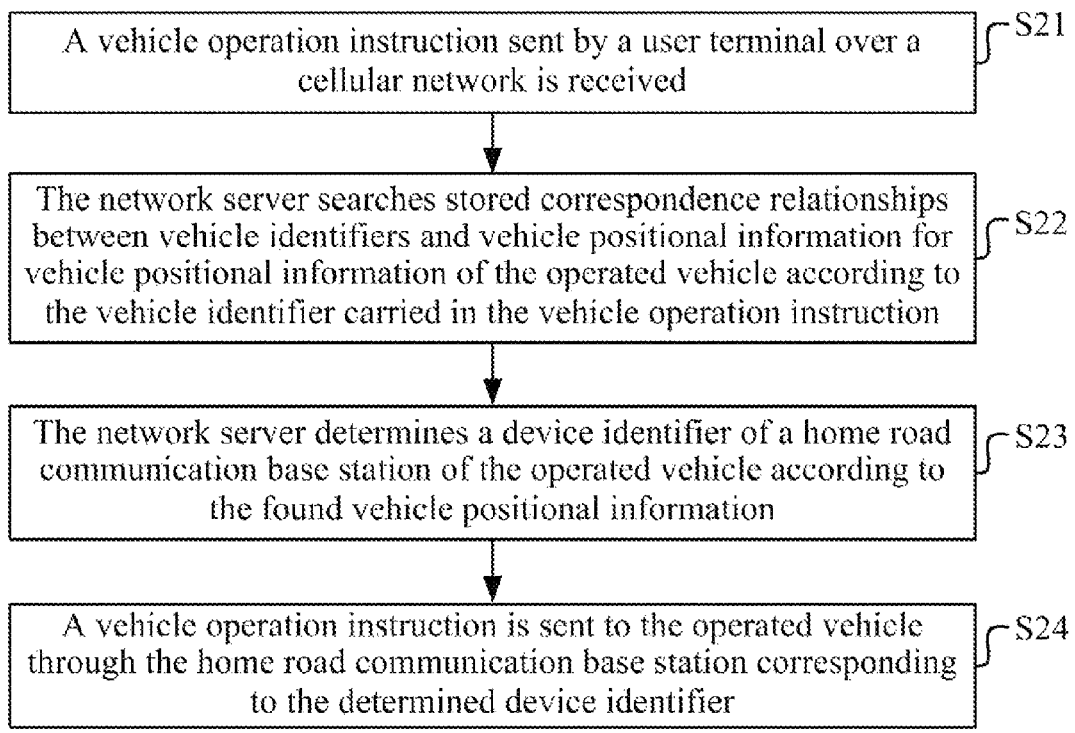
FIG. 2 illustrates a flow chart of an embodiment of a vehicle operation control method according to the present disclosure.

As illustrated in FIG. 2, there is illustrated a flow chart of an embodiment of a vehicle operation control method, which can include the following operations:

S21. A vehicle operation instruction sent by a user terminal over a cellular network is received.

In a particular implementation, if a user needs to perform a lock, unlock or another operation on a vehicle, then he or she can send the vehicle operation instruction to a network server over the cellular network using his or her user terminal by carrying the vehicle identifier of the operated vehicle in the sent vehicle operation instruction.

S22. The network server searches stored correspondence relationship between vehicle identifiers and vehicle positional information for vehicle positional information of the operated vehicle according to the vehicle identifier carried in the vehicle operation instruction.

The network server searches Table 2 or Table 3 for the vehicle positional information corresponding to the vehicle identifier according to the vehicle identifier carried in the vehicle operation instruction sent by the user terminal upon reception of the vehicle operation instruction.

S23. The network server determines the device identifier of a home road communication base station of the operated vehicle according to the found vehicle positional information.

Particularly the network server can determine the geographical position of the operated vehicle according to the vehicle positional information, and can determine which coverage area of a road communication base station does the geographical position of the operated vehicle reside according to pre-stored coverage areas of road communication base stations, to thereby determine the device identifier of the home road communication base station of the operated vehicle.

S24. A vehicle operation instruction is sent to the operated vehicle through the home road communication base station corresponding to the determined device identifier.

In a particular implementation, the operated vehicle performs a corresponding operation in response to the vehicle operation instruction upon reception of the vehicle operation instruction, where the home road communication base station V2X communicates with the operated vehicle. Particularly the home road communication base station sends the vehicle operation instruction to an Electronic Control Unit (ECU) of the operated vehicle, so that the ECU performs the corresponding operation. By way of an example in which the vehicle operation instruction is a lock instruction, the ECU locks an engine and a door.

Particularly when the home road communication base station sends the vehicle operation instruction to the vehicle, fields in a V2X data packet need to extended by adding thereto a field to represent a control instruction identifier, where the definition of the field can be preset, for example, 1 is defined to represent Lock, 0 is defined to represent Unlock, etc. Of course, if there are a large number of control instructions, then also a large number of bits in the data packet will be occupied, for example, if there are four control instructions, then they will be represented in two bits. Moreover a vehicle identifier field further needs to be arranged in the data packet so that a vehicle in the coverage area of the road communication base station can judge from the vehicle identifier field in the communication packet whether it is a data packet intended for the vehicle upon reception of the communication packet.

The vehicle can return an operation acknowledgment message to the network server through the home road communication base station after performing the corresponding operation in response to the vehicle operation instruction, and the network server can send the received operation acknowledgement message to the user terminal to notify the user of an operation result of the vehicle operation instruction.

In a particular implementation, there may be also the following application scenario: the user A sends the vehicle operation instruction to the network server, but may carry the vehicle identifier of the user B in the vehicle operation instruction due to an operation error or another reason, thus resulting in an improper operation.

Thus in order to enhance the security of vehicle operation control, the user identifier can be further carried in the vehicle operation instruction in an embodiment of the present disclosure. The network server searches its stored correspondence relationships between user identifiers and vehicle identifiers for the correspondence relationship between the user identifier and the vehicle identifier carried in the vehicle operation instruction according to the user identifier and the vehicle identifier carried in the vehicle operation instruction before the operation S22 is performed, and if the correspondence relationship is found, then the network server proceeds to the operation S22; otherwise, the network server intercepts the vehicle operation instruction, and returns an alert message of an operation failure to the user terminal.

In order to better understand the embodiment of the present disclosure, a particular implementation of the embodiment of the present disclosure will be described below by way of an example of a flow in which a user controls a vehicle operation through a user terminal.

Figure 3:
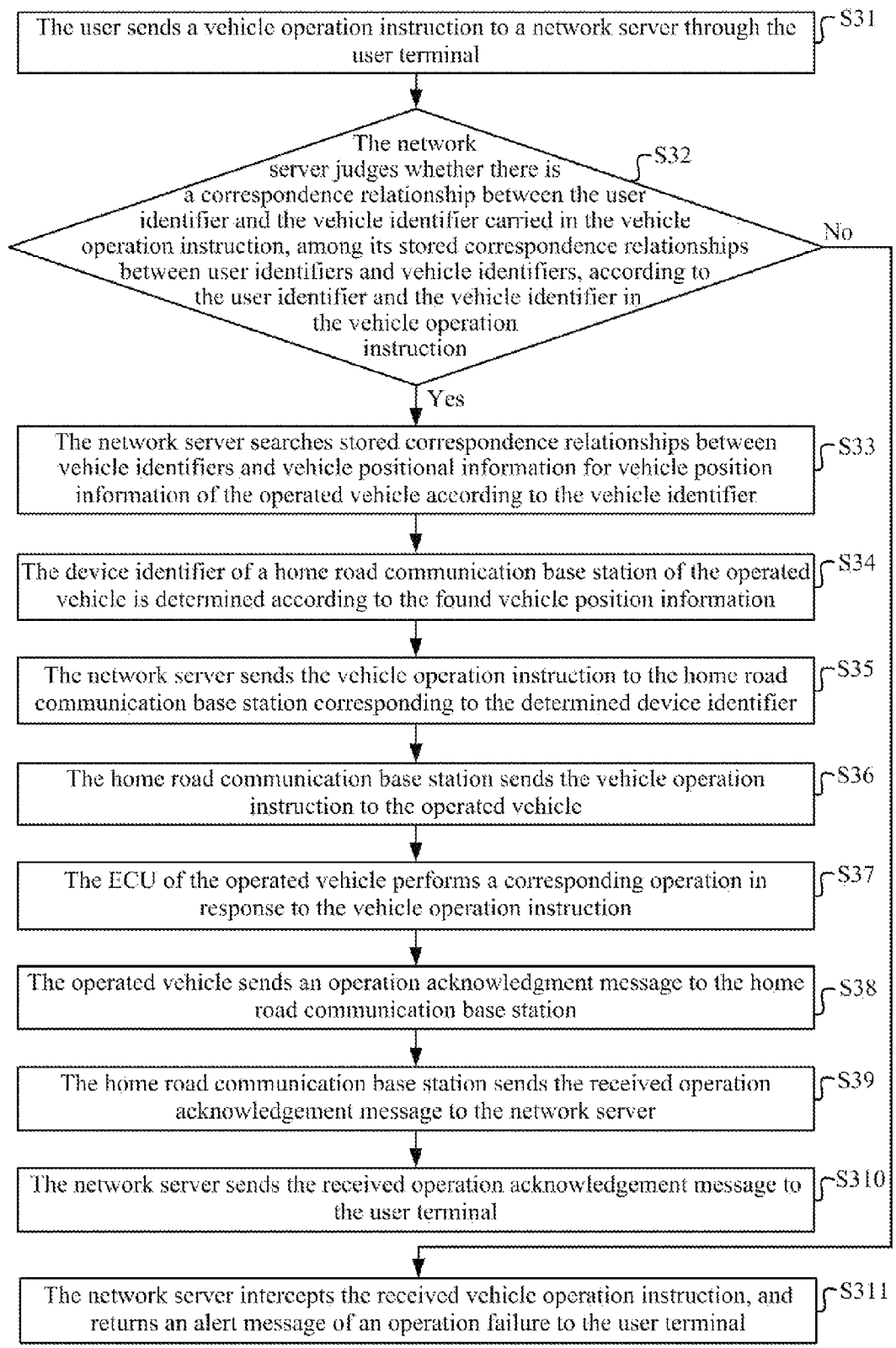
FIG. 3 illustrates a schematic flow chart in which a user controls a vehicle operation through a user terminal according to the present disclosure.

As illustrated in FIG. 3, there is illustrated a flow chart in which a user controls a vehicle operation through a user terminal, which can include the following operations:

S31. The user sends a vehicle operation instruction to a network server through the user terminal.

Particularly the sent vehicle operation instruction carries the vehicle identifier of an operated vehicle, and the user identifier of the user.

It shall be appreciated that if the user needs to perform the same operation on a plurality of vehicles, then the vehicle operation instruction can carry the vehicle identifiers of the plurality of operated vehicles together.

S32. The network server judges whether there is a correspondence relationship between the user identifier and the vehicle identifier carried in the vehicle operation instruction, among its stored correspondence relationships between user identifiers and vehicle identifiers, according to the user identifier and the vehicle identifier in the vehicle operation instruction, and if so, then the network server proceeds to the operation S33; otherwise, the network server proceeds to the operation S311.

S33. The network server searches stored correspondence relationships between vehicle identifiers and vehicle positional information for vehicle position information of the operated vehicle according to the vehicle identifier.

S34. The device identifier of a home road communication base station of the operated vehicle is determined according to the found vehicle position information.

S35. The network server sends the vehicle operation instruction to the home road communication base station corresponding to the determined device identifier.

The network server sends the vehicle operation instruction to the corresponding home road communication base station over a cellular network or a private network, where the network server carries the vehicle identifier of the operated vehicle in the sent vehicle operation instruction.

S36. The home road communication base station sends the vehicle operation instruction to the operated vehicle.

The home road communication base station sends the vehicle operation instruction to the operated vehicle through the V2X technology, and particularly the road communication base station carries the vehicle identifier of the operated vehicle, and the vehicle operation instruction in a V2X data packet, and sends the V2X data packet to an ECU of the operated vehicle.

S37. The ECU of the operated vehicle performs a corresponding operation in response to the vehicle operation instruction.

S38. The operated vehicle sends an operation acknowledgment message to the home road communication base station.

In a particular implementation, alike the operated vehicle sends the operation acknowledgement message to the home road communication base station in a V2X data packet.

S39. The home road communication base station sends the received operation acknowledgement message to the network server.

Particularly the home road communication base station sends the received operation acknowledgement message to the network server over a cellular network or a private network.

S310. The network server sends the received operation acknowledgement message to the user terminal, and the flow ends.

Particularly the network server sends the received operation acknowledgment message to the user terminal over a cellular network.

S311. The network server intercepts the received vehicle operation instruction, and returns an alert message of an operation failure to the user terminal.

In the vehicle operation control method according to the embodiment of the present disclosure, the user can send the vehicle operation instruction to the network server over the cellular network using the user terminal, the network server can send the vehicle operation instruction to the home road communication base station of the operated vehicle over the cellular network, the private network, etc., and the home road communication base station can send the vehicle operation instruction to the ECU of the operated vehicle through the V2X technology, so that the ECU can perform the corresponding operation. The vehicle operation can be performed over a long distance due to an unlimited communication distance over the cellular network. On the other hand, the server needs to authenticate the user identifier and the vehicle identifier upon reception of the vehicle operation instruction, and will issue the vehicle operation instruction only if the authentication is passed, thus improving the security of the vehicle operation over a long distance.

Figure 4:
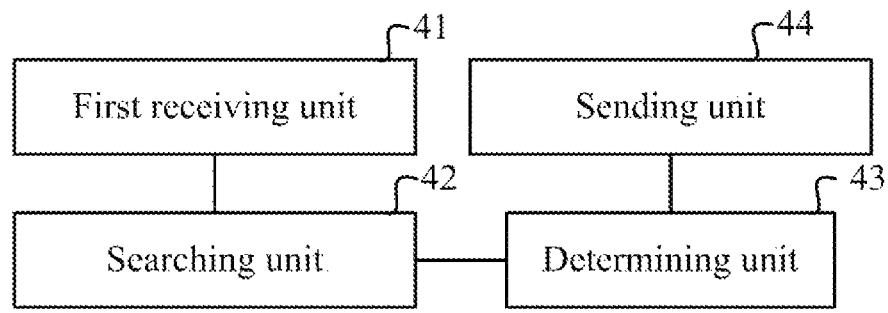
FIG. 4 illustrates a schematic structural diagram of an embodiment of a vehicle operation control device according to the present disclosure.

Based upon the same inventive idea, an embodiment of the present disclosure further provides a vehicle operation control device and system, and since the device and system address the problem under a similar principle to the vehicle operation control method, reference can be made to the implementation As illustrated in FIG. 4, there is illustrated a schematic diagram of a vehicle operation control device according to an embodiment of the present disclosure, which includes:

A first receiving unit 41 is configured to receive a vehicle operation instruction sent by a user terminal over a cellular network, wherein the vehicle operation instruction carries a vehicle identifier of an operated vehicle;

A searching unit 42 is configured to search stored correspondence relationships between vehicle identifiers and vehicle positional information for vehicle positional information of the operated vehicle according to the vehicle identifier, where the vehicle positional information is reported by the operated vehicle through a home road communication base station, and a signal coverage area of the home road communication base station covers the position where the operated vehicle is located;

A determining unit 43 is configured to determine a device identifier of the home road communication base station of the operated vehicle according to the vehicle positional information found by the searching unit 42; and A sending unit 44 is configured to send the vehicle operation instruction to the operated vehicle through the home road communication base station corresponding to the device identifier.

Particularly the vehicle operation instruction further carries a user identifier; and The device can further include:

An authenticating unit is configured to determine that there is a correspondence relationship between the user identifier and the vehicle identifier carried in the vehicle operation instruction among pre-created correspondence relationships between user identifiers and vehicle identifiers before the searching unit 42 searches the stored correspondence relationships between vehicle identifiers and vehicle positional information for the vehicle positional information of the operated vehicle according to the vehicle identifier.

In a particular implementation, the vehicle operation control device according to the embodiment of the present disclosure can further include:

A second receiving unit is configured to receive a binding request sent by the user terminal, wherein the binding request carriers a user identifier and at least one vehicle identifier; and A binding unit is configured to create respectively the correspondence relationships between the user identifier and the respective vehicle identifiers received by the second receiving unit.

For the sake of a convenient description, the respective components above have been functionally described respectively as the respective modules (or units). Of course, in an implementation of the present disclosure, the functions of the respective modules (or units) can be performed in the same one or more pieces of software or hardware. In a particular implementation, the vehicle operation control device can be arranged in a server.

Figure 5:
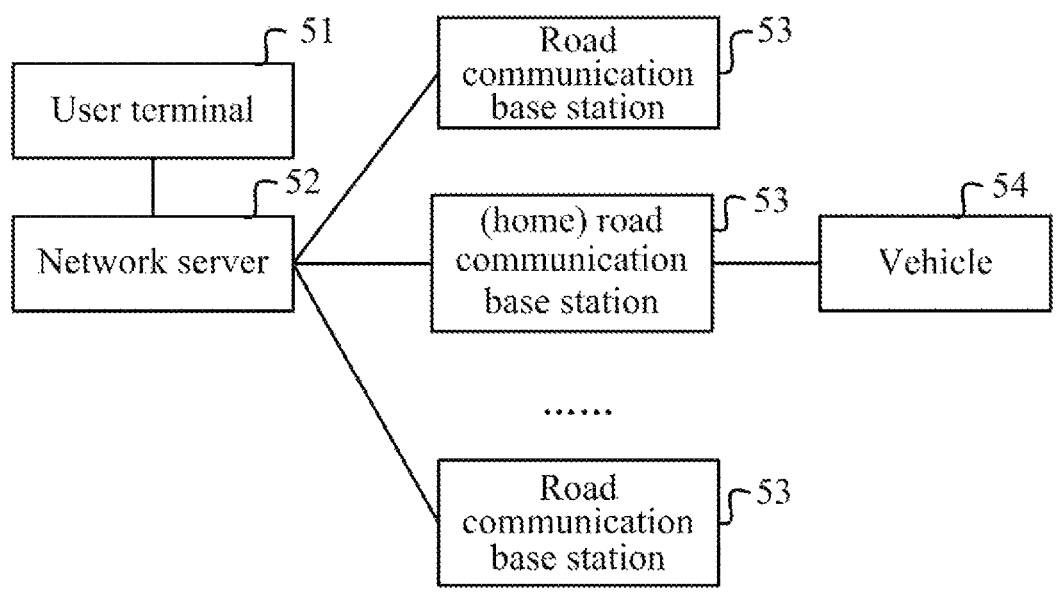
FIG. 5 illustrates a schematic structural diagram of an embodiment of a vehicle operation control system according to the present disclosure.

As illustrated in FIG. 5, there is a schematic structural diagram of a vehicle operation control system according to an embodiment of the present disclosure, which can include a user terminal 51, a network server 52, at least one road communication base station 53, and at least one vehicle 52 in which a communication module is installed, where:

The vehicle 54 is configured to report its vehicle positional information to the network server 52 over a home road communication base station 53 of the vehicle 54, where a signal coverage area of the home road communication base station 53 of the vehicle 54 covers the position where the vehicle 54 is located; and to perform a corresponding operation upon reception of a vehicle operation instruction sent by the network server 52 through the home road communication base station 53;

The user terminal 51 is configured to send the vehicle operation instruction to the network server 52, wherein the vehicle operation instruction carries a vehicle identifier of the operated vehicle;

The network server 52 is configured to store a correspondence relationship between the vehicle identifier of the vehicle 54 and the vehicle positional information reported by the vehicle upon reception of the vehicle positional information reported by the vehicle 54; and upon reception of the vehicle operation instruction, to search the stored correspondence relationships between vehicle identifiers and vehicle positional information for the vehicle positional information corresponding to the vehicle identifier carried in the vehicle operation instruction according to the vehicle identifier carried in the vehicle operation instruction; to determine a device identifier of the home road communication base station 53 of the operated vehicle according to the found vehicle positional information; and to send the vehicle operation instruction to the operated vehicle through the home road communication base station 53 corresponding to the device identifier.

In a particular implementation, the vehicle 54 is further configured to send an operation acknowledgement message to the network server through the home road communication base station after performing the corresponding operation in response to the vehicle operation instruction; and the network server 52 is further configured to send the operation acknowledgement message to the user terminal.

In a particular implementation, the vehicle operation instruction further carries a user identifier; and The network server 52 is further configured to determine that there is a correspondence relationship between the user identifier and the vehicle identifier carried in the vehicle operation instruction among pre-created correspondence relationships between user identifiers and vehicle identifiers before the stored correspondence relationships between vehicle identifiers and vehicle positional information are searched for the vehicle positional information of the operated vehicle according to the vehicle identifier.

The relevant functional units illustrated in FIG. 4 can be embodied as a hardware processor in an embodiment of the present disclosure. In a particular implementation, the processor can be configured to read one or more computer readable program codes stored in a memory, and to function as the relevant functional units illustrated in FIG. 4 by performing a process including: receiving a vehicle operation instruction sent by a user terminal over a cellular network, wherein the vehicle operation instruction carries a vehicle identifier of an operated vehicle; searching stored correspondence relationships between vehicle identifiers and vehicle positional information for vehicle positional information of the operated vehicle according to the vehicle identifier, where the vehicle positional information is reported by the operated vehicle through a home road communication base station, and a signal coverage area of the home road communication base station covers the position where the operated vehicle is located; determining a device identifier of the home road communication base station of the operated vehicle according to the found vehicle positional information; and sending the vehicle operation instruction to the operated vehicle through the home road communication base station corresponding to the device identifier.

Optionally the vehicle operation instruction further carries a user identifier, and the processor is further configured to execute the one or more computer readable program codes to perform: determining that there is a correspondence relationship between the user identifier and the vehicle identifier carried in the vehicle operation instruction among pre-created correspondence relationships between user identifiers and vehicle identifiers before the stored correspondence relationships between vehicle identifiers and vehicle positional information are searched for the vehicle positional information of the operated vehicle according to the vehicle identifier.

Optionally the processor is further configured to execute the one or more computer readable program codes to perform: receiving a binding request sent by the user terminal, wherein the binding request carriers a user identifier and at least one vehicle identifier; and creating respectively the correspondence relationships between the user identifier and the respective vehicle identifiers received by the second receiving unit.

The embodiments of the device described above are merely exemplary, where the units described as separate components may or may not be physically separate, and the components illustrated as elements may or may not be physical units, that is, they can be collocated or can be distributed onto a plurality of network elements. A part or all of the modules can be selected as needed in reality for the purpose of the solution according to the embodiments of the present disclosure. This can be understood and practiced by those ordinarily skilled in the art without any inventive effort.

With the vehicle operation control method, device and system according to the embodiments of the present disclosure, the user terminal sends the vehicle operation instruction to the network server over the cellular network, the network server searches for the positional information of the corresponding vehicle according to the vehicle identifier in the vehicle operation instruction, and determines hereby the home road communication base station in the area where the vehicle is located, and sends the vehicle operation instruction to the operated vehicle through the home road communication base station, to thereby control the operated vehicle. The vehicle operation over a long distance can be performed due to an unlimited communication distance over the cellular network.

Those skilled in the art can clearly appreciate from the foregoing description of the embodiments that the embodiments of the present disclosure can be implemented in hardware or in software plus a necessary general hardware platform. Based upon such understanding, the technical solutions above essentially or their parts contributing to the prior art can be embodied in the form of a computer software product which can be stored in a computer readable storage medium, e.g., an ROM/RAM, a magnetic disk, an optical disk, etc., and which includes several instructions to cause a computer device (e.g., a personal computer, a server, a network device, etc.) to perform the method according to the respective embodiments of the present disclosure.

Lastly it shall be noted that the embodiments above are merely intended to illustrate but not to limit the technical solution of the present disclosure; and although the present disclosure has been described above in details with reference to the embodiments above, those ordinarily skilled in the art shall appreciate that they can modify the technical solution recited in the respective embodiments above or make equivalent substitutions to a part of the technical features thereof, and these modifications or substitutions to the corresponding technical solution shall also fall into the spirit and scope of the present disclosure as claimed.

The invention claimed is:

1. A vehicle operation control method, comprising:
receiving a vehicle operation instruction sent by a user terminal over a cellular network, wherein the vehicle operation instruction carries a vehicle identifier of an operated vehicle;
searching stored correspondence relationships between vehicle identifiers and vehicle positional information for vehicle positional information of the operated vehicle according to the vehicle identifier, wherein the vehicle positional information is reported by the operated vehicle through a home road communication base station, and a signal coverage area of the home road communication base station covers the position where the operated vehicle is located;
determining a device identifier of the home road communication base station of the operated vehicle according to the found vehicle positional information; and
sending the vehicle operation instruction to the operated vehicle through the home road communication base station corresponding to the device identifier.

2. The method according to claim 1, wherein the vehicle operation instruction further carries a user identifier, and
before the stored correspondence relationships between vehicle identifiers and vehicle positional information are searched for the vehicle positional information of the operated vehicle according to the vehicle identifier, the method further comprises:
determining that there is a correspondence relationship between the user identifier and the vehicle identifier carried in the vehicle operation instruction among pre-created correspondence relationships between user identifiers and vehicle identifiers.

3. The method according to claim 2, wherein creating the correspondence relationships between user identifiers and vehicle identifiers comprises:
receiving a binding request sent by the user terminal, wherein the binding request carriers a user identifier and at least one vehicle identifier, and
creating correspondence relationships between the received user identifier and respective vehicle identifiers respectively.

4. The method according to claim 1, wherein the home road communication base station sends the vehicle operation instruction to the operated vehicle in a V2X message comprising a field carrying the vehicle identifier of the operated vehicle, and another field carrying the vehicle operation instruction.

5. A vehicle operation control device, comprising:
one or more processors; and
a memory, wherein:

one or more computer readable program codes are stored in the memory, and the one or more processors are configured to perform the one or more computer readable program to perform:

receiving a vehicle operation instruction sent by a user terminal over a cellular network, wherein the vehicle operation instruction carries a vehicle identifier of an operated vehicle;

searching stored correspondence relationships between vehicle identifiers and vehicle positional information for vehicle positional information of the operated vehicle according to the vehicle identifier, wherein the vehicle positional information is reported by the operated vehicle through a home road communication base station, and a signal coverage area of the home road communication base station covers the position where the operated vehicle is located;

determining a device identifier of the home road communication base station of the operated vehicle according to the found vehicle positional information; and sending the vehicle operation instruction to the operated vehicle through the home road communication base station corresponding to the device identifier.

6. The device according to claim 5, wherein the vehicle operation instruction further carries a user identifier, and the one or more processors are further configured to perform the one or more computer readable program to perform:

before the stored correspondence relationships between vehicle identifiers and vehicle positional information are searched for the vehicle positional information of the operated vehicle according to the vehicle identifier, determining that there is a correspondence relationship between the user identifier and the vehicle identifier carried in the vehicle operation instruction among pre-created correspondence relationships between user identifiers and vehicle identifiers.

7. The device according to claim 6, wherein the one or more processors are further configured to perform the one or more computer readable program to perform:

receiving a binding request sent by the user terminal, wherein the binding request carriers a user identifier and at least one vehicle identifier, and creating correspondence relationships between the received user identifier and respective vehicle identifiers respectively.

8. A vehicle operation control system, comprising a user terminal, a network server, at least one road communication base station, and at least one vehicle in which a communication module is installed, wherein:

the vehicle is configured to report its vehicle positional information to the network server over a home road communication base station of the vehicle, wherein a signal coverage area of the home road communication base station of the vehicle covers the position where the vehicle is located; and to perform a corresponding operation upon reception of a vehicle operation instruction sent by the network server through the home road communication base station;

the user terminal is configured to send the vehicle operation instruction to the network server, wherein the vehicle operation instruction carries a vehicle identifier of the operated vehicle;

the network server is configured to store a correspondence relationship between the vehicle identifier of the vehicle and the vehicle positional information reported by the vehicle upon reception of the vehicle positional information reported by the vehicle; and upon reception of the vehicle operation instruction, to search the stored correspondence relationships between vehicle identifiers and vehicle positional information for the vehicle positional information corresponding to the vehicle identifier carried in the vehicle operation instruction according to the vehicle identifier carried in the vehicle operation instruction; to determine a device identifier of the home road communication base station of the operated vehicle according to the found vehicle positional information; and to send the vehicle operation instruction to the operated vehicle through the home road communication base station corresponding to the device identifier.

9. The system according to claim 8, wherein:

the vehicle is further configured to send an operation acknowledgement message to the network server through the home road communication base station after performing the corresponding operation in response to the vehicle operation instruction; and the network server is further configured to send the operation acknowledgement message to the user terminal.

10. The system according to claim 8, wherein the vehicle operation instruction further carries a user identifier; and the network server is further configured to determine that there is a correspondence relationship between the user identifier and the vehicle identifier carried in the vehicle operation instruction among pre-created correspondence relationships between user identifiers and vehicle identifiers before the stored correspondence relationships between vehicle identifiers and vehicle positional information are searched for the vehicle positional information of the operated vehicle according to the vehicle identifier.

11. The system according to claim 9, wherein the vehicle operation instruction further carries a user identifier; and the network server is further configured to determine that there is a correspondence relationship between the user identifier and the vehicle identifier carried in the vehicle operation instruction among pre-created correspondence relationships between user identifiers and vehicle identifiers before the stored correspondence relationships between vehicle identifiers and vehicle positional information are searched for the vehicle positional information of the operated vehicle according to the vehicle identifier.

* * * * *